United States Patent
Zelinski et al.

(10) Patent No.: US 7,464,066 B2
(45) Date of Patent: Dec. 9, 2008

(54) MULTI-DIMENSIONAL, EXPERT BEHAVIOR-EMULATION SYSTEM

(75) Inventors: Pavel Zelinski, Boulder, CO (US); Grigory Baytsur, Moscow (RU); Ivan Kopiev, Moscow (RU); Vitaly Grechko, Moscow (RU); Oleg Sidorkin, Moscow (RU); Andrey Belousov, Moscow (RU)

(73) Assignee: Applied Intelligence Solutions, LLC, Westminster, CO (US)

( * ) Notice: Subject to any disclaimer, the term of this patent is extended or adjusted under 35 U.S.C. 154(b) by 480 days.

(21) Appl. No.: 10/974,383

(22) Filed: Oct. 26, 2004

(65) Prior Publication Data

US 2006/0089830 A1    Apr. 27, 2006

(51) Int. Cl.
G06N 5/00    (2006.01)
(52) U.S. Cl. .......................... 706/60; 370/229
(58) Field of Classification Search ............ 706/60, 706/31; 600/544; 382/219; 370/229
See application file for complete search history.

(56) References Cited

U.S. PATENT DOCUMENTS

| | | | |
|---|---|---|---|
| 5,447,166 A * | 9/1995 | Gevins | 600/544 |
| 5,588,091 A * | 12/1996 | Alkon et al. | 706/31 |
| 5,598,510 A | 1/1997 | Castelaz | |
| 5,793,888 A * | 8/1998 | Delanoy | 382/219 |
| 6,044,356 A | 3/2000 | Murthy et al. | 705/8 |
| 6,112,190 A | 8/2000 | Fletcher et al. | 705/38 |
| 6,556,977 B1 | 4/2003 | Lapointe | |

(Continued)

OTHER PUBLICATIONS

AIS "A Next Generation Optimization Approach to Allocation" A white paper by Retail IT Star.

(Continued)

Primary Examiner—Wilbert L Starks, Jr.
(74) Attorney, Agent, or Firm—Swanson & Bratschun, L.L.C.

(57) ABSTRACT

An expert decision-making method is emulated based on a history of behaviors by experts in a variety of observed situations. The history of behaviors is built up from observations of actions taken by experts in analyzing a plurality of situations. Situation data representative of a situation to be processed is received, and situation features are extracted from the situation data. Each situation feature is associated with an expert behavior method used to process the situation. A behavior method is recognized from a pattern of situation features. Recognizing a behavior method is based on feature/method separation data in multidimensional space of features into areas with each area associated with a method used by experts. Parameter values for parameters in the recognized behavior method are calculated based on the situation features. The calculation of parameter values is accomplished by recognizing parameter calculation rules and calculating the parameter values using the rules. A parameter calculation rule for each parameter in the behavior method is recognized from a pattern of situation features. Recognizing a parameter calculation rule is based on feature/parameter-calculation-rules separation data of multidimensional space of features into areas with each area associated with a parameter calculation rule used by experts. The recognized behavior method is executed on the situation data using the calculated parameter values to recommend a solution for the situation. The recommended solution has solution data representing a plan of action to provide the solution and remainder data representing unprocessed situation data. A test detects whether the remainder data is in a target range. If the remainder data is not in the target range, the actions to recommend a solution are repeated until the test detects the remainder data is in the target range.

12 Claims, 11 Drawing Sheets

U.S. PATENT DOCUMENTS

| | | |
|---|---|---|
| 6,947,378 B2 * | 9/2005 | Wu et al. .................... 370/229 |
| 2006/0089830 A1 | 4/2006 | Zelinsky |
| 2006/0112047 A1 | 5/2006 | Zelinsky |

OTHER PUBLICATIONS

Hung (2001) IEEE Proceedings of the 34th Hawaii International Conference on System Sciences "Expert Versus Novice Use of the Executive Support System: An Empirical Study".

Kanungo (2001) Decision Support Systems 30:419-436 "Evaluation of a Decision Support System for Credit Management Decisions".

Sidani (1995) IEEE International conference of Systems, Man and Cybernetics 3:2428-2433 "IASKNOT: A Simulation-Based Object-Oriented Framework for Learning Acquisition of Implicit Expert Knowledge".

Adelman (1991) IEEE Transactions on Systems, Man and Cybernetics 21:293.

* cited by examiner

MULTI-DIMENSIONAL, EXPERT BEHAVIOR-EMULATION SYSTEM

RELATED APPLICATIONS

This invention is related to commonly assigned, U.S. application Ser. No. 10/976,218, entitled "TRAINING A MULTI-DIMENSIONAL, EXPERT-BEHAVIOR EMULATION SYSTEM" by Pavel Zelinsky et al. and concurrently filed herewith.

TECHNICAL FIELD

This invention relates to a multi-dimensional, long-term behavior, computerized decision method and system. More particularly, the invention relates to providing computer operations to perform routine decisions based on the historical performance of experts in the decision process.

BACKGROUND OF THE INVENTION

There are many routine decision tasks where a person receives input data from a computer and analyzes the data to come to a decision. In some cases, these decision tasks are multi-dimensional in input and cannot easily be grouped into a relatively small number of classes. Because the decisions cannot be so grouped, the decision process does not lend itself to automated or expert processes provided in traditional recognition or classification problems.

Further for many of these decision problems, it is difficult to measure the quality of each individual decision made by a person, but it is possible to measure the integral quality of a plurality of decisions as a whole made by the person over a period of time. This integral quality can be compared against other persons making similar decisions over a period of time and the relative expertise of each decision maker can be measured.

One example of routine decision tasks based on input data as discussed above is in retail goods allocation tasks. In such tasks a distribution or allocation expert reviews input data on a computer display screen a quantity of retail goods to be allocated in various quantities from warehouses to multiple retail stores selling the goods. Where there are 10 to 1000+ stores in the business and the quantity of goods to be allocated to each store varies from 0 to 100+, the number of possible allocation outcomes can easily exceed several thousand. Such a decision problem is so multi-dimensional it does not lend itself to automated solution based on recognition and classification systems.

Further, to measure the quality of an allocation by examining a specific allocation is not meaningful. For example, if a specific set of goods such as swimsuits is allocated to certain stores and turns out not to be profitable for those stores, this result may be due to weather conditions rather than lack of experience by the allocator. On the other hand, if over an entire season all the goods allocated by this same allocator generate the highest total profit or other metric, this same person might be recognized as an expert allocator. In other words, there is no absolutely right or wrong decision for each decision problem, but there are the best (expert) and the poorest decision makers.

Another problem in computerizing routine decision tasks of the above type is that best practices in the environment of the decision problem may change over time. For example, in the allocation of retail goods, business practices may change over time because of changes to the competitive environment or changes in the goals of the business entity.

SUMMARY OF THE INVENTION

In accordance with this invention an expert decision-making method is emulated based on a history of behaviors by experts in a variety of observed situations. A history of behaviors is built up from observations of actions taken by experts in analyzing a plurality of situations. The observations are captured, and behaviors from the observations are constructed. The behaviors indicate an association between situation features and methods with parameters for solving the situations.

Situation data representative of a situation to be processed is received, and situation features are extracted from the situation data. A behavior method is recognized from a pattern of situation features. Parameter values for parameters in the recognized behavior method are calculated based on the situation features. The recognized behavior method is executed on the situation data using the parameter values to recommend a solution for the situation.

The recommended solution has solution data representing a plan of action to provide the solution and remainder data representing unprocessed situation data. A test detects whether the remainder data is in a target range. If the remainder data is not in the target range, another behavior method from a pattern of situation features from the remainder data is recognized. Parameter values, based on the situation features from the remainder data, are calculated for parameters in this second recognized behavior method. This second recognized behavior method is executed on the remainder data using its parameter values to recommend a solution for the situation. These actions are repeated until the test detects the remainder data is in the target range.

A solution strategy is displayed to a user. The strategy display includes all the recognized behavior methods with their parameter values and the solution data and remainder data for each recognized method. Adjustments to the strategy may be received from the user. The adjustments will be changes of behavior methods or changes of parameter values to arrive at the solution.

The above calculation of parameter values is accomplished by recognizing parameter calculation rules and calculating the parameter values using the rules. A parameter calculation rule for each parameter in the behavior method is recognized from situation features. Recognizing a parameter calculation rule is based on feature/parameter-calculation-rules separation data in a pattern of features in multidimensional space with each feature associated with a parameter calculation rule used by experts. Similarly, recognizing a behavior method is based on feature/method separation data in a pattern of features in multidimensional space with each feature associated with a method used by experts.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

In the present invention, expertise is derived from past experience of experts making decisions on the type of situation data being processed. The decision-making process itself is empirical as the experts have learned what method choices applied to the situation data representing a situation provide a best plan of action to solve the situation The choice of method to solve the situation may or may not include a choice of parameters to be used with that method. The expert in working with situation data, that has multiple dimensions as discussed herein, has become an expert heuristically, i.e. by trial and error, and developed an extensive personal knowledge base and historical background to analyze and solve problems provided by the situation data.

For example, in merchandise allocation an allocator may spend six months or a year learning how to effectively allocate retail goods to a chain of stores. As the merchandise allocator becomes more expert, the profitable allocation of retail goods improves for the stores. Further, some merchandise allocators seem to have more talent for doing the allocations than other allocators. Accordingly, an expert emulating computer system emulating the behavior of the most talented allocators can be extremely valuable to a large retail company. Such a computing system provides expert guidance to new merchandise allocators who are not yet expert, or provides expert guidance to lower performing allocators.

Figure 1:
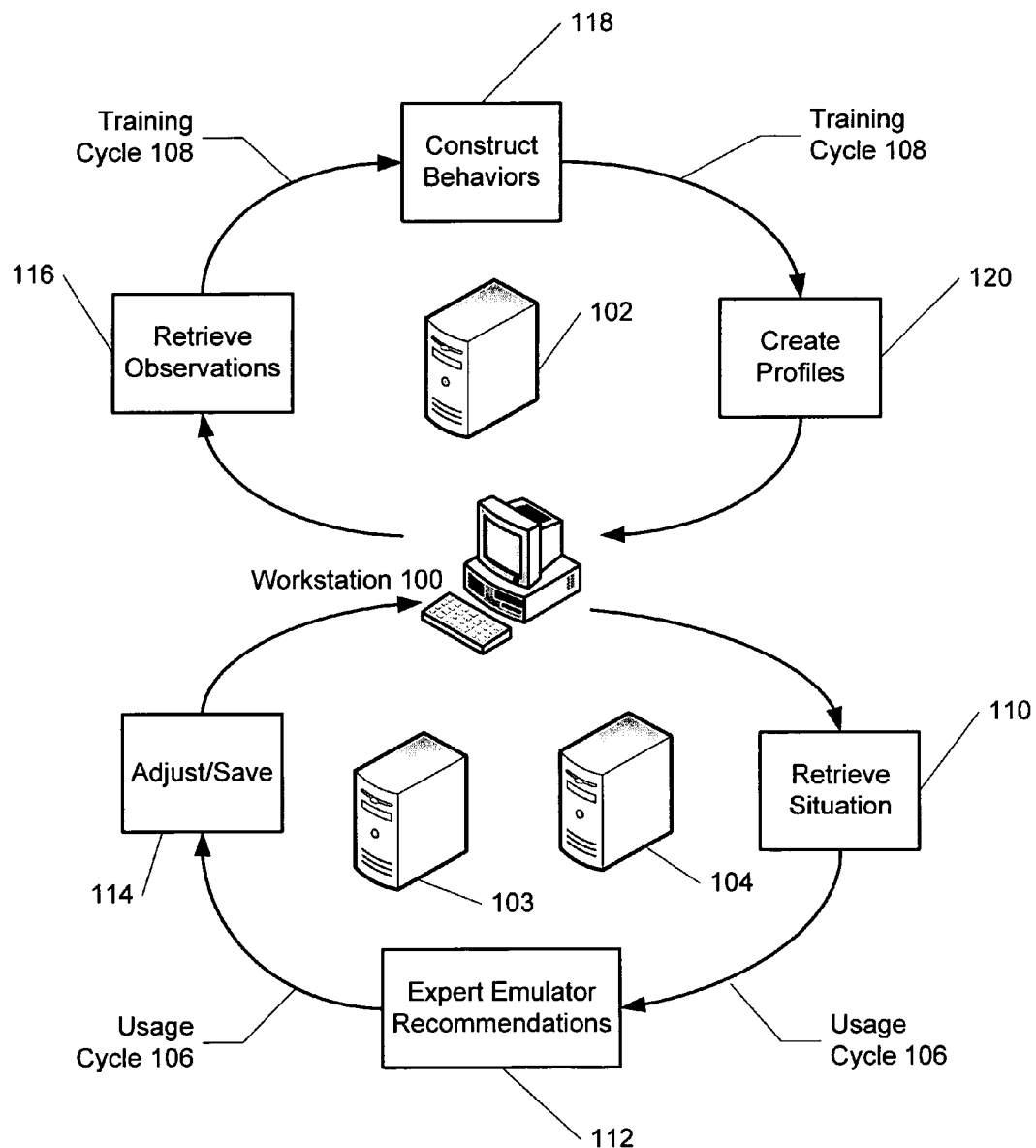
FIG. 1 shows the flow of system work in one embodiment of the invention.

FIG. 1 shows the flow of system work in one embodiment of the invention; the user interactive work is performed at a workstation 100. Typically there are many workstations and a workstation may be referred to herein as a user workstation or an expert workstation. There are two cycles of operation for the expert emulating system—the usage cycle 106 and the training cycle 108. The designation expert workstation refers to users that have enough expertise that observations of their actions are used in the training cycle. A usage cycle is performed at all user workstations, but training cycle is performed for expert workstations only. One or more supplier servers 102 work with the expert workstation to perform the training cycle 108, and a suppler server 103 and a customer server 104 work with the user workstation to perform the usage cycle. "Supplier" as used herein refers to the provider of the expert behavior emulating system. The usage cycle runs on-demand as a user at the workstation 100 processes situation data requiring a solution. In the training cycle 108 retrieve observations operation 116 runs constantly to capture observation data over a reasonable period of time. The complete loop of the training cycle runs periodically as the supplier server 102 creates and/or updates profiles for use during the usage cycle.

In the example of a merchandise allocation system the usage cycle runs on demand when an allocator requests allocation of situation data, such as goods to be allocated to a set of stores in a chain of retail outlets. The complete loop of the training cycle in this example might run only once a week or even once a year or more. The profile which contains allocation methods and other allocation data is normally adjusted for long term changes in the allocation process. When a profile is first created by the training cycle, it can be expected that adjustments and new allocation observations will be frequent and the training cycle will run frequently, i.e. daily or even hourly. After the profile has been updated for several weeks, the adjustments to a solution and new observation information regarding behavior of an expert will be minimal. The profile has settled down, and the updates to the profiles by the training cycle will be come weekly, monthly or even quarterly on the calendar.

The usage cycle begins with retrieval operation 110 which retrieves the situation data selected by the user and provides the situation data to the expert behavior emulator 112. The expert emulator 112 analyzes the situation data and makes a solution recommendation to the user. The user reviews the solution recommendation, and adjust/save operation 114 may or may not adjust the solution based on input from the user. After a final solution is reached and approved by the user, the solution data is saved by adjust/save operation 114 to the customer database as a solution for the situation data being analyzed. The usage cycle is described in more detail hereinafter with reference to FIG. 3.

The training cycle begins with retrieval operation 116 which retrieves observations regarding actions taken by the expert when dealing with particular situation data. This situation data and actions information are used by the behavior construct operation 118 to construct expert behaviors. From these expert behaviors, profile create operation 120 creates the profiles for use by the expert behavior emulator 112 in the usage cycle. The training cycle is described in more detail hereinafter with reference to FIG. 8.

Alternatively, retrieval operation 116 and behavior construct operation 118 might be performed for all users, and decisions about which users are experts might be made later at profile create operation 120. This allows for better flexibility in case of a need to change a user assignment to expert or non-expert. Because all behaviors are collected in this alternative embodiment and it is not necessary to start retrieve operation 116 and construct behaviors operation 118 from the beginning.

Figure 2:
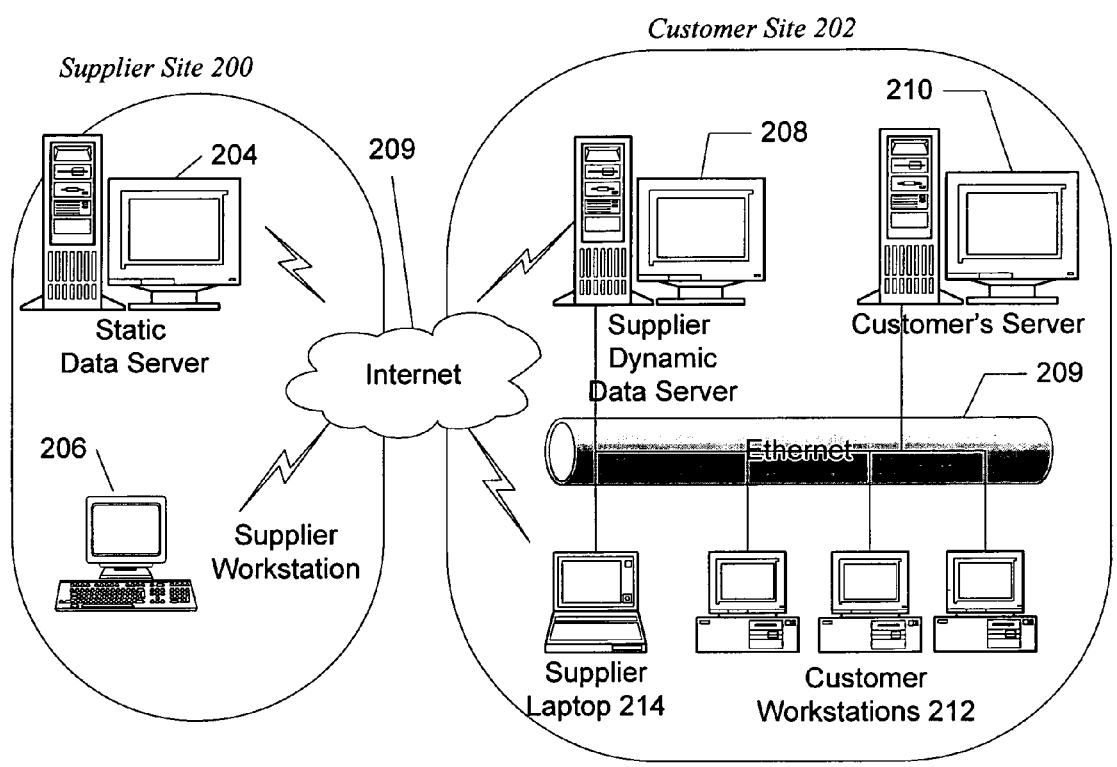
FIG. 2 illustrates the computer and communication environment in which the present embodiments of the invention will typically operate.

FIG. 2 is illustrative of the computer and communication environment in which the present embodiments of the invention will typically operate. The supplier of the expert emulating system is usually located at a supplier site 200 remote from the customer site 202. The supplier site includes a static data server 204 and a supplier workstation 206. The training cycle of FIG. 1 is performed on the supplier workstation 204 and static data server 206 in the supplier site 200. At the customer site 202 there is also a supplier dynamic data server 208 that receives the profiles and any other administrative updates from the static data server 204 at the supplier site.

Communication is usually over the Internet 209 as depicted in FIG. 2, but could occur over any type of telecommunication link.

The customer site 202 also has the customer's server 210, which maintains the customer's database of situation data. A customer network 209 at the customer site interconnects the customer's server with supplier's dynamic data server 208 and the customer's workstations 212. The supplier also has an administrative laptop 214 connected to the customer network. Thus a user works at the workstations 212, and the user's work is assisted in the methodology of recommending situation solutions in accordance with the usage cycle discussed above for FIG. 1. Note that the supplier workstation 206 and the supplier administrative laptop 214 are indicated as also connected to the Internet and, thus, could be remote from the supplier's static data server and the supplier's dynamic data server 208. A computing device, such as servers, desktop computers, laptop computers, and computer workstations in FIG. 2, typically includes at least some form of computer-readable media. Computer readable media can be any available media that can be accessed by the computing devices. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing devices in FIG. 2.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The logical operations of the various embodiments of the present invention are implemented (1) as a sequence of computer implemented acts or program modules running on a computing device and/or (2) as interconnected machine logic circuits or circuit modules within the computing device. The implementation is a matter of choice dependent on the performance requirements of the system implementing the invention. Accordingly, the logical operations making up the embodiments of the present invention described herein may be referred to variously as operations, structural devices, acts or modules. It will be recognized by one skilled in the art that these operations, structural devices, acts and modules may be implemented in software, in firmware, in special purpose digital circuit logic, and any combination thereof without deviating from the spirit and scope of the present invention as recited within the claims attached hereto.

The drawings in FIGS. 3-11 shall follow the illustrating convention of operations or modules being indicated by rectangles, decision operations being indicated by diamonds, and information being indicated by trapezoids. Further, the same item referenced in multiple drawings will be given the same reference numeral.

Figure 3:
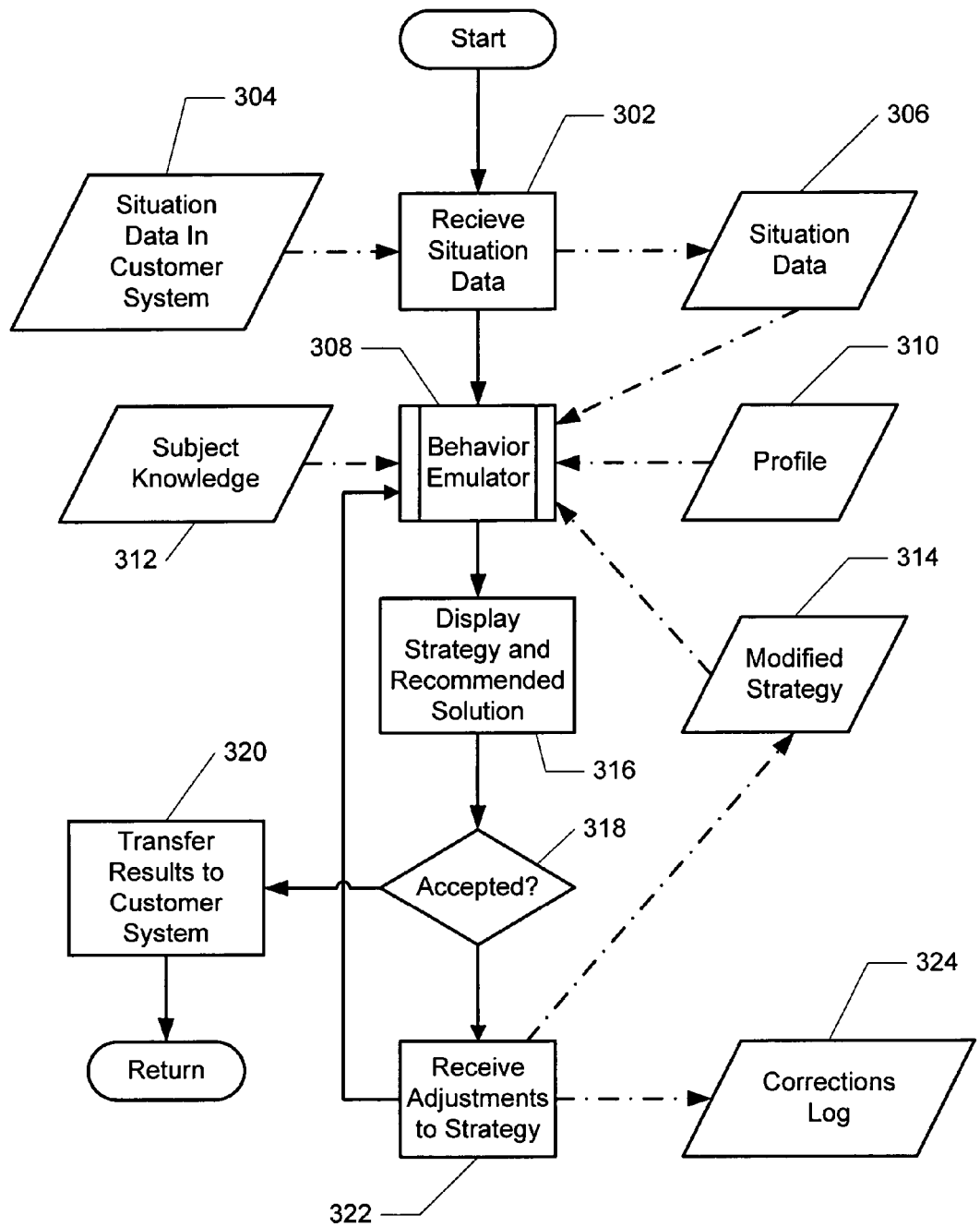
FIG. 3 shows the operational flow of the usage cycle illustrated in FIG. 1.

FIG. 3 shows the operational flow of the usage cycle in FIG. 1 in more detail. Receive operation 302 receives from the data 304 in the customers system the situation data 306 selected by a user at the workstation. In the merchandise allocation example the situation data would be a quantity of goods to be allocated to a plurality of stores operated by the customer, budget and other planning information, past store performance information, current store performance information if available, any other data that might be useful for allocation decision, and the expert or user would be the merchandise allocator. The situation data 306 is received from the customer's system and stored in working storage at the workstation.

The behavior emulator module 308 than works with the situation data 306, the profile 310, and the subject knowledge information 312 to recommend a situation solution to the user at the workstation. The profile is a generalization of observed decisions made by experts, where a single decision is a sequence of methods with or without parameter values that have in the past been used by experts as solutions in observed situations. The subject knowledge includes a methods library, a parameters library and a features library. The methods library includes set of expert behavior methods used by the experts in the past. A method includes a method name, a list of required input parameters and a method execution code, i.e. the method operations. The parameters library includes the parameter lists and limitations for the parameters in the methods; it also includes parameter calculation rules. The features library includes the features of the situation data and feature calculation rules. The solution recommended by the behavior emulator will be solution data indicating a plan of action and remainder data indicative of situation data remaining to be processed. The sequence of methods producing the recommended solution along with parameter values for the methods is referred to herein as a strategy.

The recommended solution from and the strategy used by the behavior emulator are both displayed by display operation 316 to the user at the workstation computer screen. A typical display would identify each method used along with its parameter values, the situation solution data and remainder data at each stage or iteration of the strategy, i.e. a strategy iteration refers to the execution of one of the methods with its parameters in a sequence of methods making up a strategy. The next iteration works on the remainder data with the next method in the sequence. The strategy is completely executed when the remainder data represents a value within a predetermined range deemed acceptable for a solution to the situation.

For example in the case of merchandise allocation, the display of each iteration of the strategy would identify a method used along with the parameter values used, the solution data, i.e. the number of goods allocated to each store, and the remainder data, i.e. the number of goods unallocated. In merchandise allocation, the strategy will not be complete usually until the remainder is zero.

When the recommended solution is displayed, the user is given an opportunity to adjust the strategy or accept the strategy. If the strategy is accepted, accept test detects the indication from the user, and the operational flow branches to transfer operation 320. Transfer operation 320 transfers the recommended solution into the customer's database. Normally, transfer operation 320 does not transfer an entire strategy to the customer system, because a strategy includes behavior steps that lead to the solution. Alternatively, the transfer operation could transfer the strategy as well as the solution. The transfer operation always transfers the recommended solution. In the case of merchandise allocation, the allocation for goods, i.e. the solution, would be transferred into the customers' database and the goods would be distributed accordingly.

If the user decides to adjust the strategy, the accept test detects that adjustments are made and the operation flow passes to receive adjustments operation 322. Adjust strategy operation receives the adjustment input from the user and uses that input to modify the strategy being used by the behavior emulator. The receive operation 322 also generates a corrections log 324 to record the strategy adjustment for subsequent use in a training cycle. After the adjust strategy operation, the operation flow returns to the behavior emulator to re-execute the strategy which has now been modified. The modified strategy 314 is used by the behavior emulator module 308 along with the subject knowledge and the profile to recommend a new situation solution. Depending on input from the user, the behavior emulator module 308 may just change one method in the strategy and execute the other methods in the strategy unchanged. Additionally, the behavior emulator may be instructed by the user that it is allowed to adopt other methods in the strategy subsequent to the method changed by the user.

Figure 4:
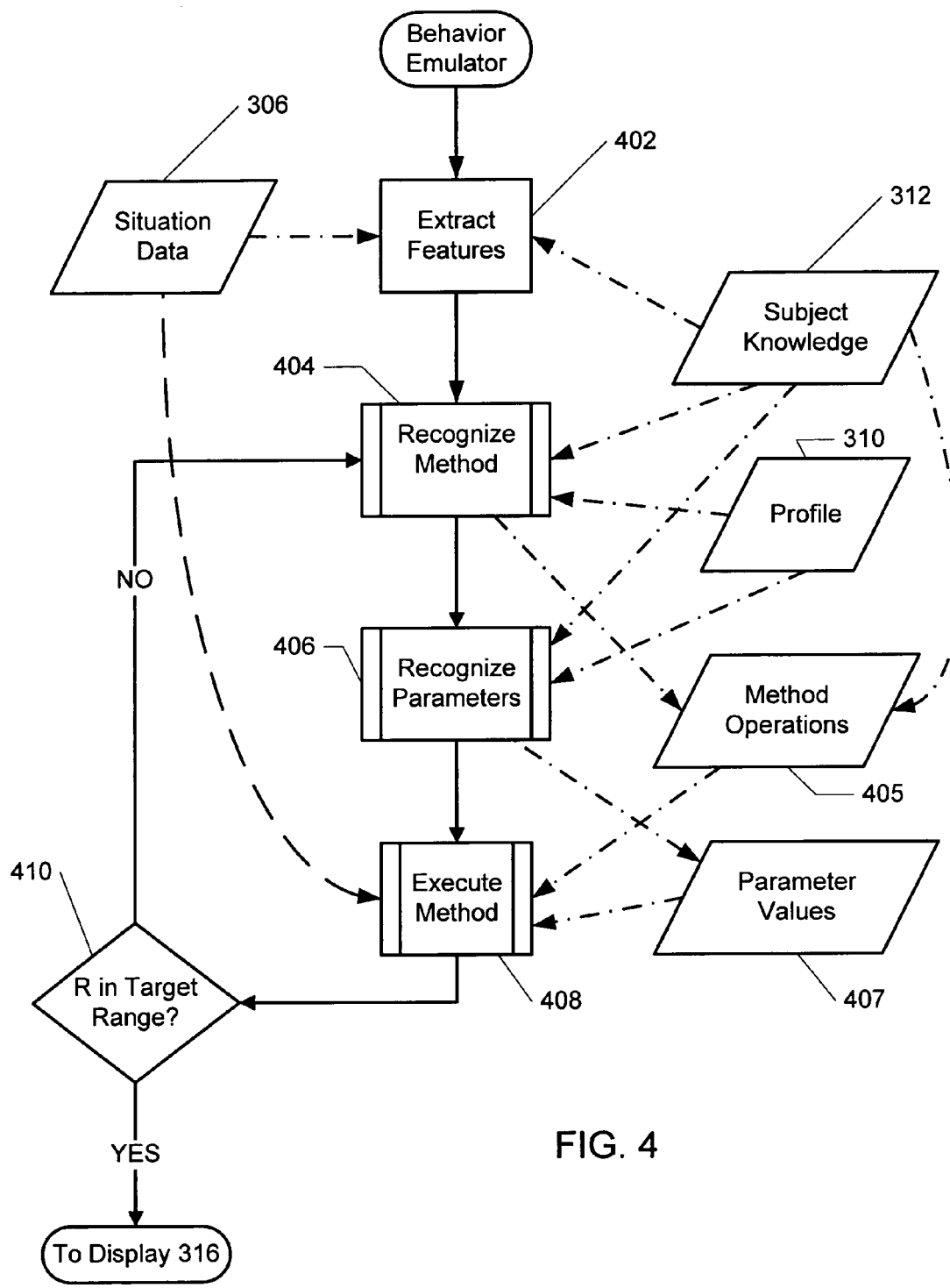
FIG. 4 shows the operational flow of the behavior emulator module 308 in FIG. 3.

FIG. 4 illustrates the operational flow of the behavior emulator module 308 in FIG. 3. Feature extract operation 402 gets feature name and feature calculation rules information from the subject knowledge information 312 and extracts situation features from the situation data 306 based on the feature calculation rules. The feature calculation rules may operate on all features or may operate on a subset of features to extract situation features that will be useful in recognizing the method to be executed to provide a solution. It is also true that if there are no feature calculation rules for a given feature, than that feature in the situation data is not processed and is not used by the feature extraction operation 402 to produce a situation feature.

Recognize method module 404 receives the situation features from feature extract operation 402, and it receives the method choices from the subject knowledge 312 and features/methods separation data from the profile 310. Using pattern recognition techniques in multi-dimensional space for all the situation features, and using the features/methods separation data, the recognize method module selects a method to be executed against the situation data.

Figure 5:
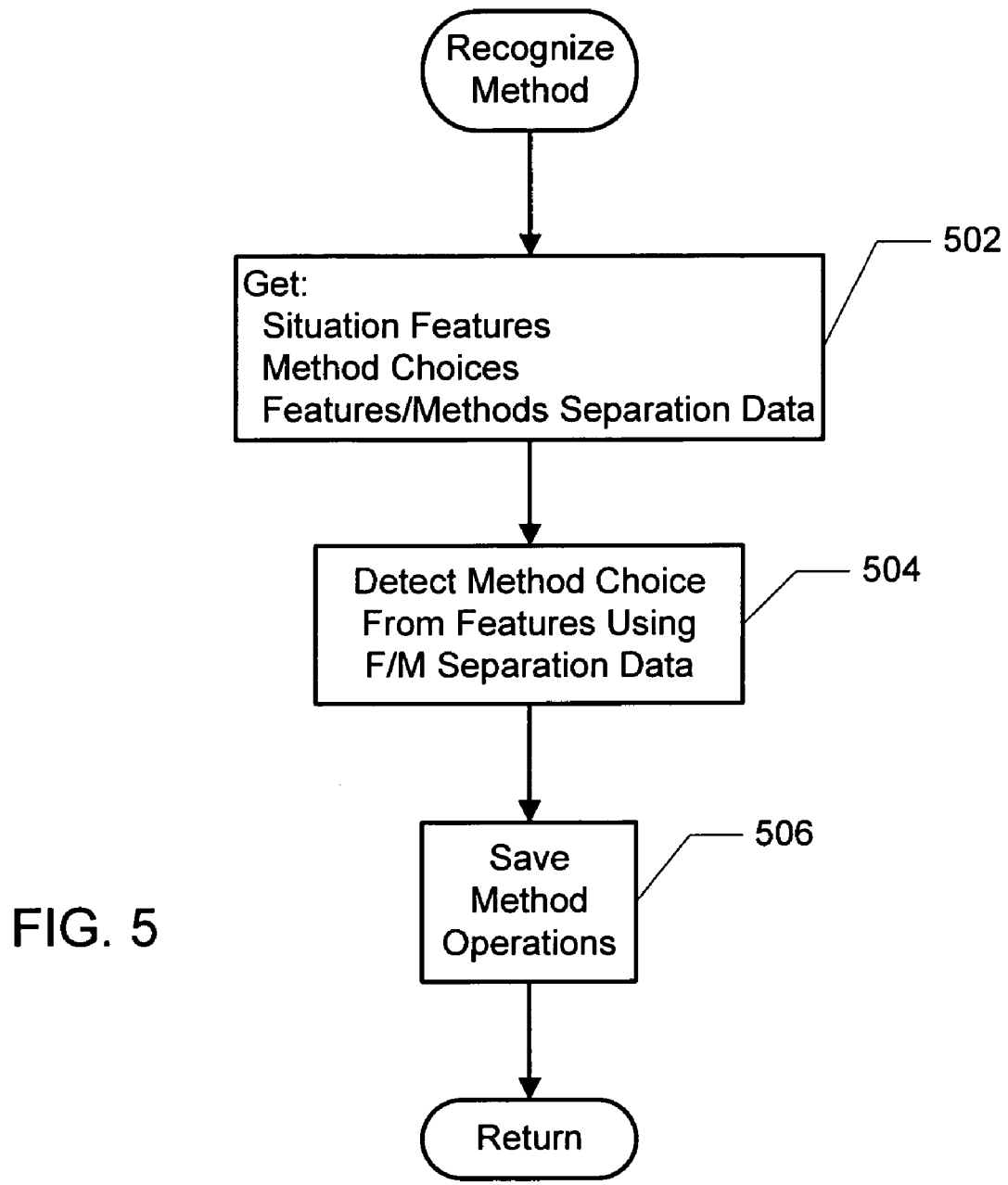
FIG. 5 shows the operational flow of the recognize method module 404 in FIG. 4.

The operation flow for the recognize method module 404 is shown in FIG. 5. Get operation 502 in FIG. 5 retrieves the situation features, the method choices and the features/methods separation data. The features and methods are analyzed as patterns of numeric data. Alternatively, they might be analyzed as patterns of graphical data. In any case it is easier to understand the analysis if the situation features and the features/methods separation data are imagined as a graph in multi-dimensional space with a graph axis for the various features and graph points for the feature values with each point labeled with a method name. Features/methods separation data is multi-dimensional surface(s), which separates the entire graphical space into areas populated mainly by graph points labeled with one method name or no graph point at all. Each area is labeled with a method name, representing the method that prevails in that area. The method represented by that area is the best choice for discriminating between situation features in that area, and the best method to be used to find a situation solution. Detect operation 504 will use feature values to plot a new graph point in the same multi-dimensional space. Operation 504 detects the area where the new graph point appears using features/methods separation data, and select a method name associated with that area as the best choice for a method to operate on the situation data.

In the example of merchandise allocation, the selected method might be an initial allocation method, and the initial quantity of retail goods and retail stores would be the situation features. Save method operation 506 retrieves the operations for the selected method and saves the method operations 405 in working storage for subsequent use by execute method module 408 in FIG. 4.

Recognize parameters module 406 in FIG. 4 receives the situation features from the extract features operation 402, it receives the parameter lists and the limitations associated with the parameters in the selected method from the subject knowledge 312, and it receives the features/parameters-calculation-rules separation data from the profile 310. The operation flow for the recognize parameters module 406 is shown in FIG. 6.

Figure 6:
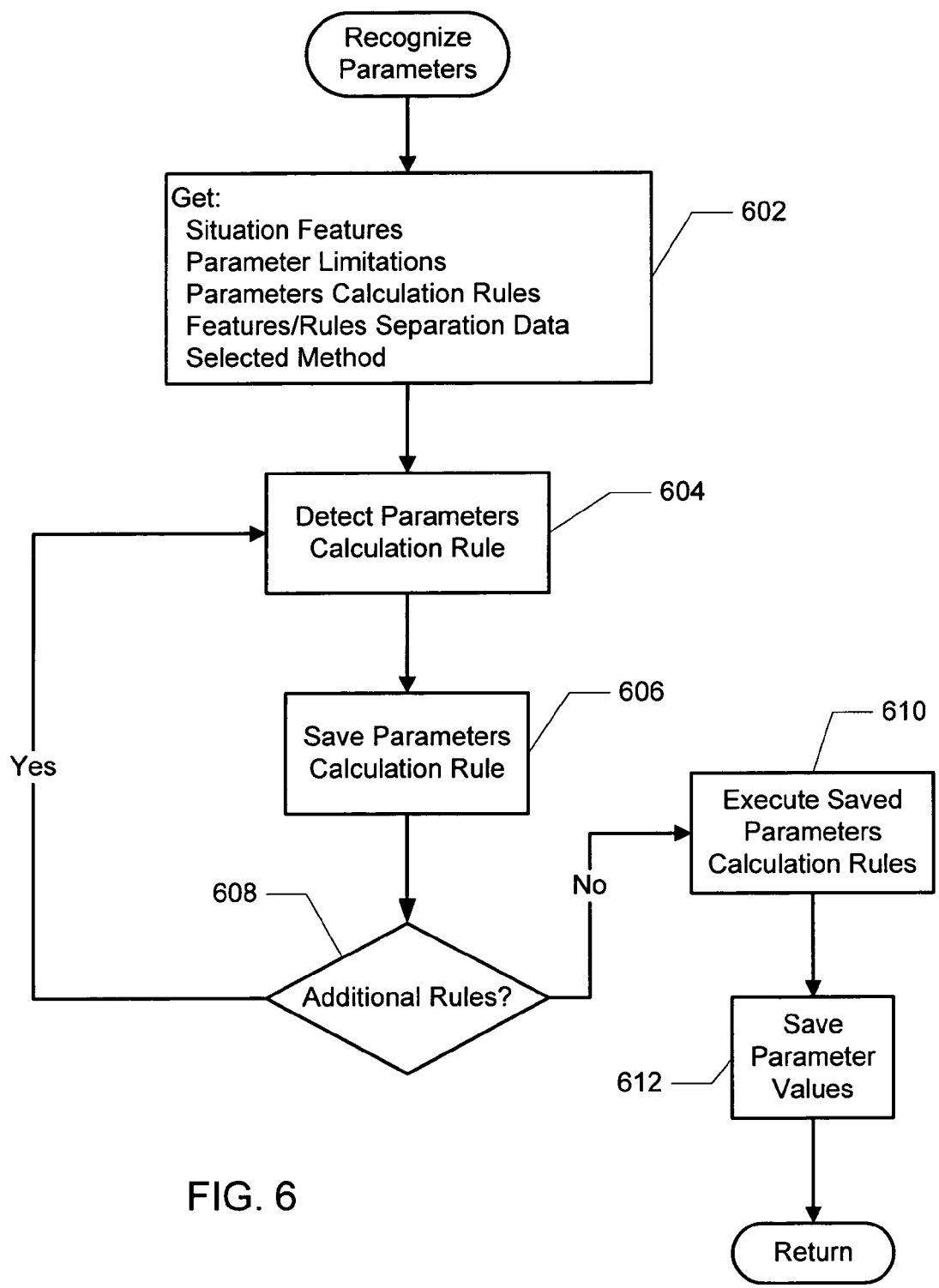
FIG. 6 shows the operational flow of the recognize parameters module 406 in FIG. 4.

Get operation 602 in FIG. 6 retrieves the situation features, the parameter limitations, parameters calculation rules from the parameter library from subject knowledge information 312. The features/parameters-calculation-rules separation data is retrieved from the profile 310, and the selected method is retrieved from the recognize method module 404. Parameter values calculation is a hierarchical process. Detect operation 604 detects a parameters calculation rule using a technique as described at FIG. 5 for detect operation 504. Detect operation 604 uses situation features, available parameter calculation rules and features/parameter calculation rules separation data to detect the parameters calculation rules to be used. The features and parameters calculation rule are analyzed as patterns of numeric data. They may also be analyzed as patterns of graphical data. The analysis is most easily understood if the data is imagined as being graphed in multi-dimensional space with a graph axis for the various features and graph points for the feature values with each point labeled with a parameters calculation rule. Features/parameters-calculation-rules separation data is multi-dimensional surface(s) which separates the entire graphical space into areas populated mainly by graph points labeled with one rule or no graph point at all. Each area is labeled with a parameters calculation rule, representing the rule that prevails in that area. The rule represented by that area is the best choice for calculating parameter values for situation features in that area. Detect operation 604 will use feature values to plot a new graph point in the same multi-dimensional space. Operation 604 detects the area where the new graph point appears using features/rules separation data, and selects a rule associated with that area as the best choice for calculating parameter values for the method to operate on the situation data.

Save operation 606 saves the detected parameters calculation rule. A rules algorithm might require more parameters calculation rules for its execution, but some rules algorithms do not require any more parameters calculation rules and can be executed without any additional rules. If last saved rule requires parameters calculation rules, then additional rules test operation 608 branches the flow to detect operation 604, and operations 604 and 606 repeat to detect parameters calculation rule for this rule algorithm. If last saved rule does not require additional parameters calculation rules, the operation flow branches to the execute operation 610. The execute operation executes all saved parameters calculation rules.

Save operation 612 saves parameter values obtained on the previous step, and the operation flow returns to execute method module 408 in FIG. 4.

Execute method module 408 in FIG. 4 receives the situation data 306, the method operations 405 for the selected method, and the parameter values 407 for parameters in the selected method. The execute method module 408 executes the method operations using the parameter values and produces a solution for the situation data. The operation flow for the execute method module 408 is shown in FIG. 7.

Figure 7:
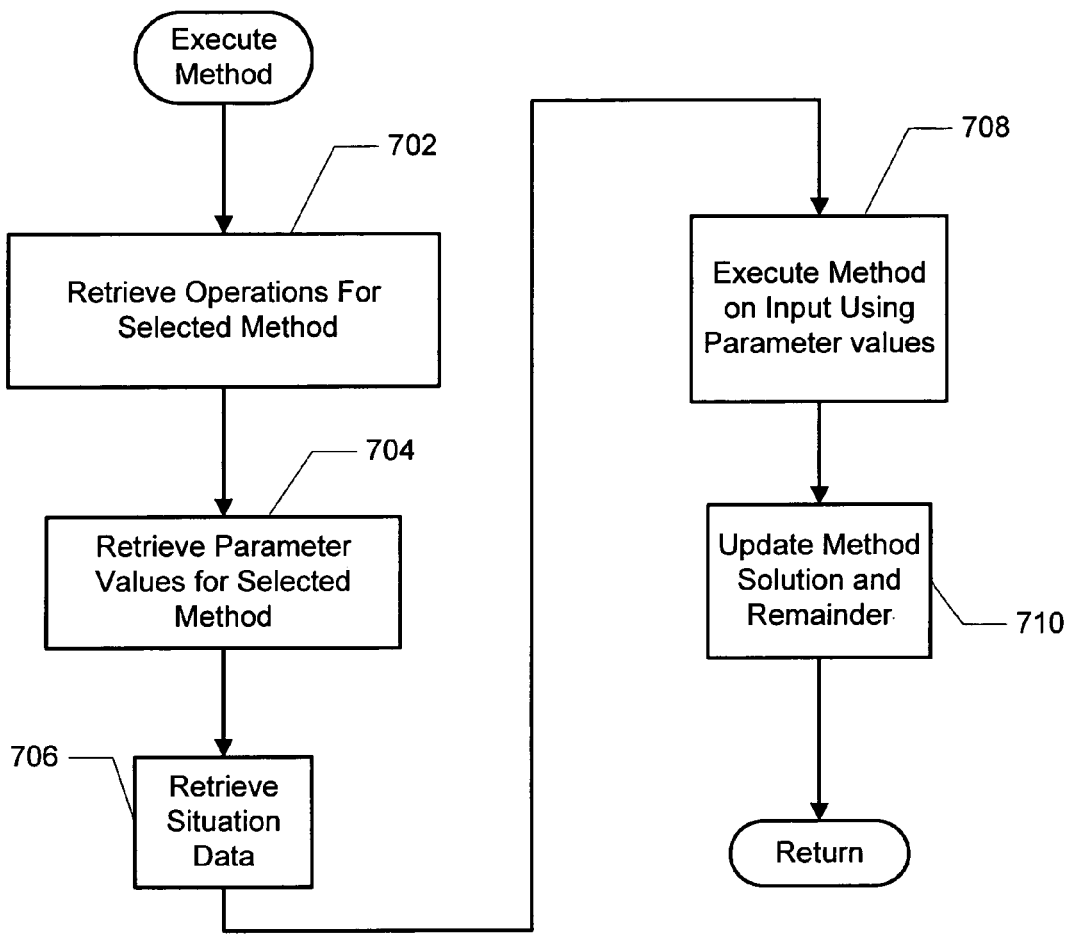
FIG. 7 shows the operational flow of the execute method module 408 in FIG. 4.

The method retrieve operation 702 in FIG. 7 retrieves the method operations from subject knowledge 312 for the selected method from working storage. Parameter retrieve operation 704 retrieves the parameter values 407 for the parameters in the selected method from working storage. Retrieve operation 706 retrieves the situation data to which the method and its parameter values are to be applied. Execute operation 708 now uses the parameter values for the selected method and executes the method operations of the selected method on the situation data. The result will be solution data and remainder data.

In the merchandise allocation example the solution data will be the quantity and type of goods allocated to each retail store, and the remainder data will be the remaining quantity and type of goods not allocated by the selected method. Update operation 710 saves the current method, its parameters, the solution data and the remainder data, and the operation flow returns to remainder test operation 410 in FIG. 4.

In FIG. 4 remainder test operation 410 tests whether the remainder data is in an acceptable target value range. The remainder data "R" being in an acceptable target value range might be satisfied if R is greater than, equal to or less than a number, or it might be satisfied if R is within a range of numbers or a set of ranges. Further, the number(s) might be positive or negative. If the remainder is in acceptable target value range, the operation flow returns to display operation 316 in FIG. 3. Display operation 316 displays the information saved by the update operation 710 in FIG. 7 to the user at the computer display of the workstation.

If the remainder is not in an acceptable target range, the operation flow returns to recognize method module 404. Recognize method module 404, recognize parameters module 406 and execute method module 408 operate as described above except that now the situation features are limited to those represented by the remainder data. The operational flow stays in an operational loop through modules 404, 406, 408 and test operation 410 until R is in an acceptable target range. This completes the description of the operation flow in the usage cycle shown in FIG. 1.

Figure 8:
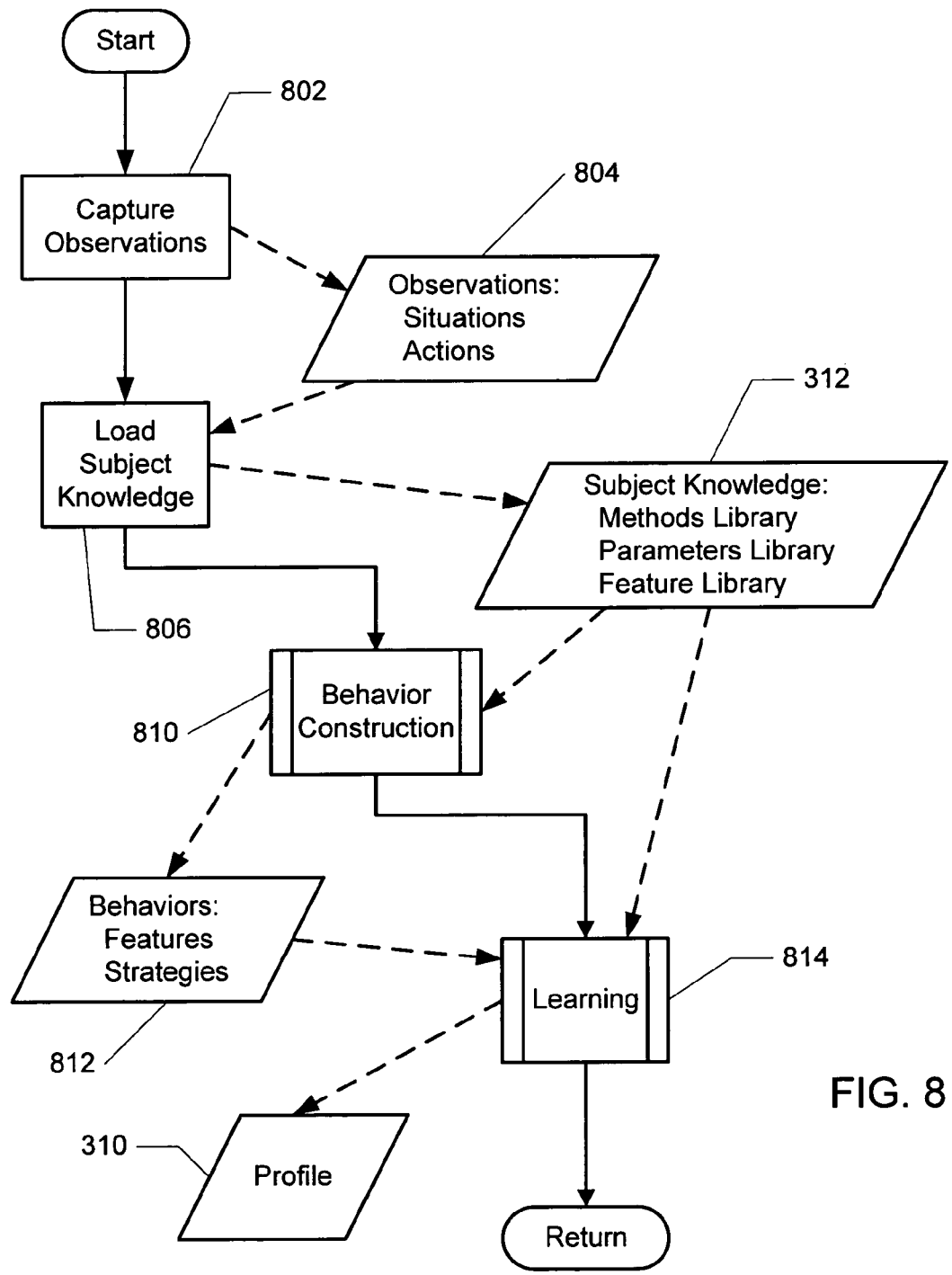
FIG. 8 shows the operational flow of the training cycle illustrated in FIG. 1.

The training cycle of FIG. 1 is shown in the detail training operation flow of FIG. 8. The operation flow in FIG. 8 begins with capture operation 802 that captures observations of actions by the expert user and associates those actions with situations documented in the situation data.

The observations data 804 thus contains situations and actions. Actions refers to keyboard and mouse or other input by the expert user as she works at the workstation 100 on situation data as well as observed data and data available from observation data screens and from the corrections log 324. The situation data represents a given situation for which a solution is being sought by the expert as well as all supportive information available to the expert for the decision-making. In the merchandise allocation example a situation would be described by the situation data specifying the quantity of retail goods to be allocated to a set of stores in a retail chain, budget and other planning information, past store performance information, current store performance information if available, any other data might be useful for allocation decision.

Load operation 806 receives the observations 804 and extracts unique methods used, parameter lists and limitations, and features from those observations and loads the extracted information into the subject knowledge information 312. Load operation could be manual at the beginning and made semi-automated as methods, parameters and features become familiar. The subject knowledge information 312 as described in the usage operational flow includes the methods library, the parameters library, and the features library. These libraries are used by the behavior construction module 810 to construct behavior information 812. Behavior information includes features and strategies as described above in reference to the usage cycle. The behavior construction module 812 is described in more detail hereinafter with reference to FIG. 9.

After the behavior information has been constructed it is provided to the learning module 814. The behaviors include situation features and strategies. The learning module works with the features and strategies to create the profile 310 of expert decisions for use by the behavior emulator. After the learning module creates the profile 310, the training cycle is complete. The operation of the learning module is described hereinafter with reference to FIG. 11.

Figure 9:
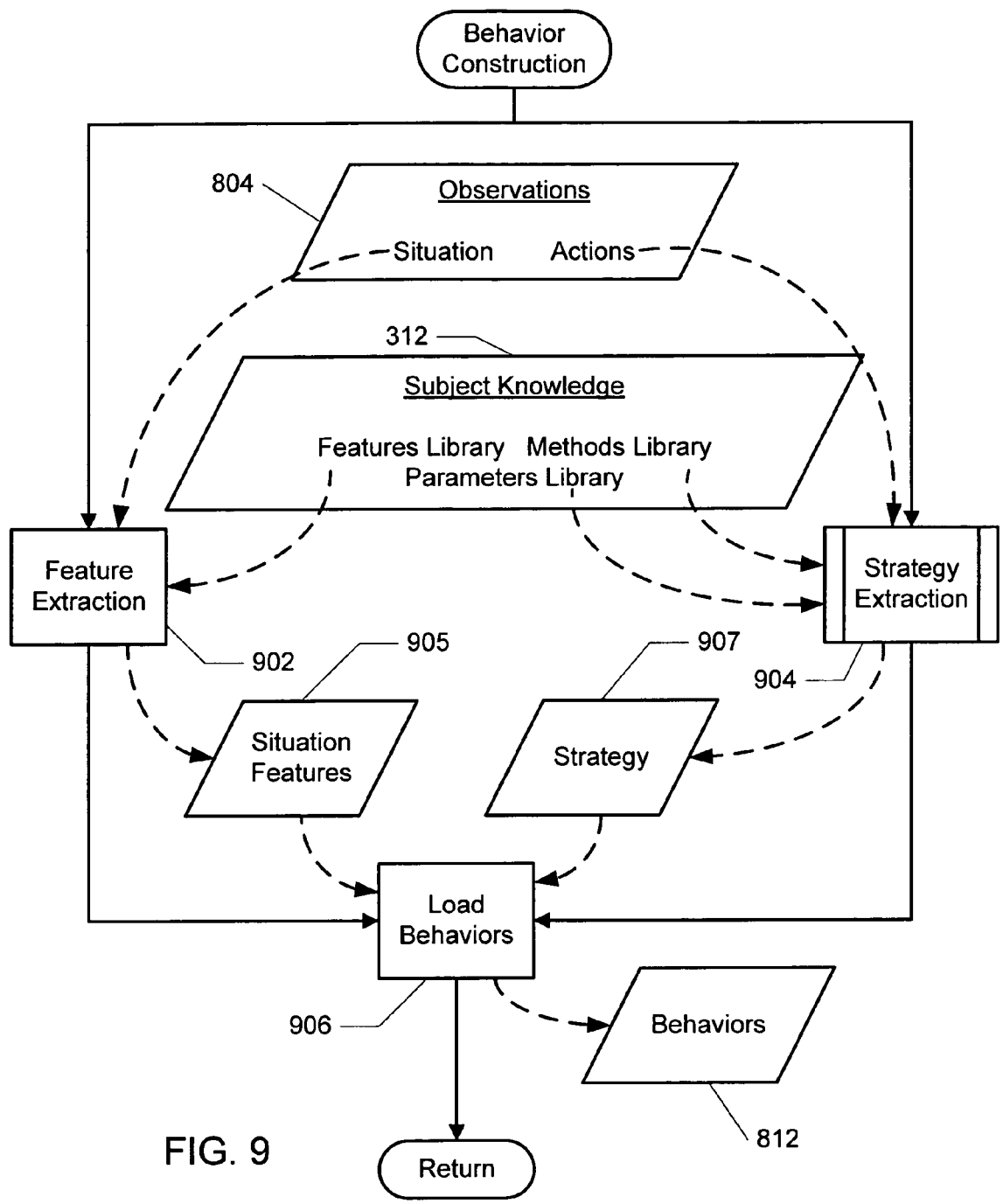
FIG. 9 shows the operational flow of the behavior construction module 810 in FIG. 8.

FIG. 9 illustrates the operational flow of the behavior construction module 810 in FIG. 8. The behavior construction module performs two important operations when working with the observations 804 and the subject knowledge information 312. One operation is a feature extraction operation 902 and the other operation is strategy extraction operation 904. The subject knowledge information includes a methods library, a parameters library and a features library. The methods library includes set of methods used by experts to find solutions to prior situations. A method includes a method name, a list of required input parameters and method execution code. The parameters library includes the parameter lists and limitations for the parameters in the methods. Also it includes parameter-calculation-rules. The features library includes the features of the situation data and feature calculation rules.

Feature extraction operation 902 receives the situation data from observations 804 and the feature names and calculation rules from the features library in the subject knowledge 312. The feature extract operation 902 uses the feature names and feature calculation rules to extract the situation features from the situation data.

The strategy extraction module 904 receives the actions data from the observations information 804 and it receives the method choices from the methods library and the parameter limitations for parameters in the methods from the parameters library in the subject knowledge 312. From this information the strategy extraction operation determines a strategy associated with an action. The strategy is defined by methods and their parameter values. The strategy extraction module 904 is described in more detail hereinafter with reference to FIG. 10.

In FIG. 9 the load behaviors operation 906 receives the situation features 905 created by feature extraction operation 902. It also receives the strategy 907 extracted by the strategy extraction module. The strategy 907 is associated with situation features 905 by the load behaviors operation 906. The load operation 906 loads the associated features and strategy in behaviors information 812. This behaviors information is used by the learning module 814 of FIG. 8, which is shown in detail in FIG. 11.

Figure 10:
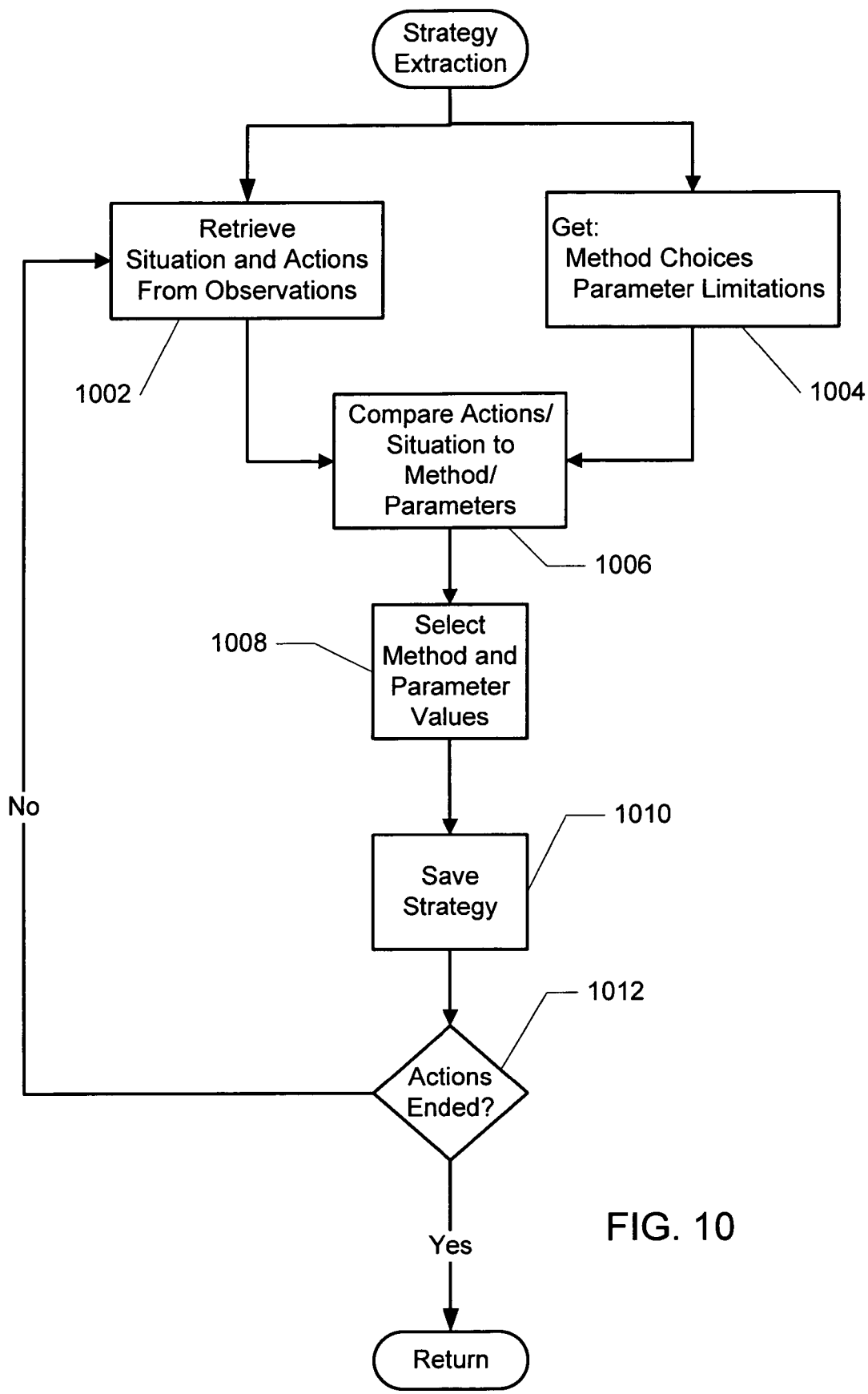
FIG. 10 shows the operational flow of the strategy extraction module 904 in FIG. 9

FIG. 10 illustrates the operational flow of the strategy extraction module 904 of FIG. 9. The operational flow for strategy extraction module begins with the retrieve operation 1002 and get operation 1004. Retrieve operation 1002 retrieves the situations and actions associated with situations from the observations information 804. Get operation 1004 gets the method choices along with parameter limitations from subject knowledge information for the methods that may be used to work with a given situation/actions combination.

The compare operation 1006 compares the situation/actions information with the method/parameters information and passes the results of the comparison onto the select operation 1008. Based on the historical association between the situation/actions and a method/parameters combination, the selection operation 1008 selects a behavior method along with its parameters to be used with the situation/actions combination by the user. The method and parameter values selected in operation 1008 are then saved as one strategy iteration (method and parameter values) as strategy information 907 (FIG. 9) by save operation 1010.

After the method/parameter selection is saved, actions ended test 1012 detects whether there are more actions in the processing of the situation that need to be evaluated. If there are more actions, then the operation flow returns to retrieve operation 1002, which retrieves the next situation/actions combination from the observations information. Compare operation 1006 then finds the best behavior method/parameter combination to be used with the situation/actions combination. Select operation 1008 then selects the best method and parameters for the situation/actions combination and save operation 1010 saves that as the next method/parameters iteration in the strategy information 907. This cyclic loop continues until all actions have been handled by the strategy extraction operational flow. When all actions have been processed, the operational flow returns to the load behaviors operation 906 in FIG. 9, which then works with the situation features 905 and strategy 907 extracted by the FIG. 10 operational flow.

Figure 11:
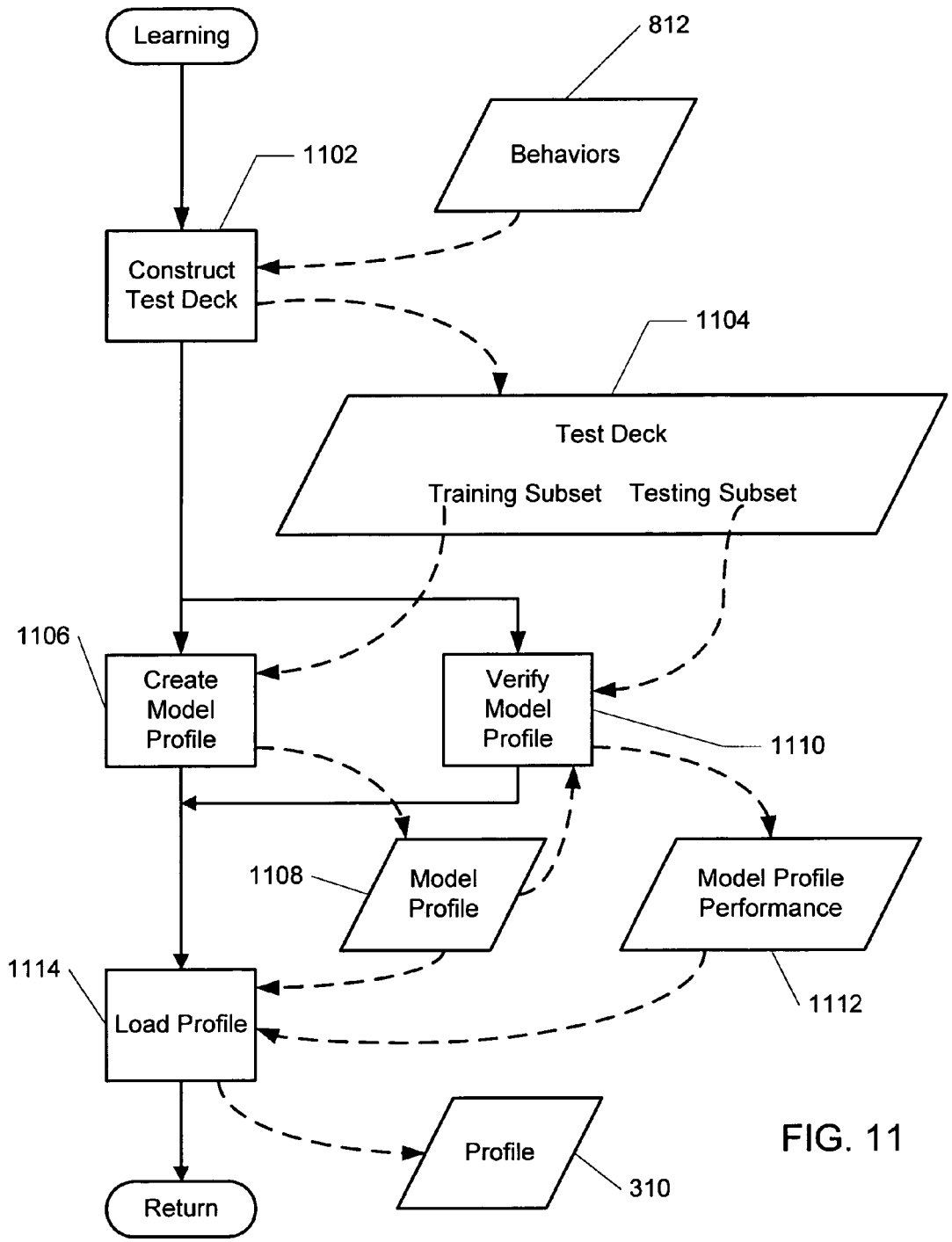
FIG. 11 shows the operational flow of the learning module 814 in FIG. 8.

In FIG. 11 the operational flow for the learning module 814 in FIG. 8 is shown. The operational flow in the learning module begins with construct operation 1102 constructing a test deck. The test deck is constructed from expert behaviors in behaviors 812 created by behavior construction operation flow in FIG. 9. selection of experts from a set of users is mainly a management decision process, probably using a consulting service. The test deck 1104 contains two subsets of information. A first subset is a training subset. The training subset is used by create model profile operation 1106 to create a model profile 1108. Model profile contains features/methods separation data, features/parameters-calculation-rules separation data, separation decisions thresholds, decision applicability thresholds. The model profile 1108 is used by a verify model profile operation 1110 to verify the effectiveness of the strategies in the model profile. This verify model operation uses a testing subset also created by construct operation 1102 to test the performance of the model profile created from the training subset. This model performance is stored as model profile performance 1112. Load profile operation 1114 then receives the model profile 1108 and the model profile performance 1112. It loads both into the profile 310 for use by the behavior emulator module 308 in FIG. 3. This completes the description of the training cycle.

While the invention has been particularly shown and described with reference to preferred embodiments thereof, it will be understood by those skilled in the art that various other changes in the form and details may be made therein without departing form the spirit and scope of the invention.

What is claimed is:

1. A computer method for emulating an expert decision-making process based on an history of behaviors by human experts in a variety of observed merchandise allocation situations to provide a user a recommended-allocation of merchandise solution to a merchandise allocation-situation to be processed, the method comprising:
   receiving situation data representative of a merchandise allocation situation to be processed;
   extracting situation features from the situation data;
   recognizing a behavior method from a pattern of situation features and identifying the recognized behavior method;
   calculating parameter values based on the situation features for parameters in the recognized behavior method;
   executing the recognized behavior method on the situation data using the parameter values to provide a recommended merchandise allocation solution for the merchandise allocation situation; and
   displaying the recommended merchandise allocation solution to the user.

2. The method of claim 1 wherein the recommended merchandise allocation solution comprises solution data representing a plan of action to provide the merchandise allocation solution and remainder data representing unprocessed situation data.

3. The method of claim 2 further comprising:
   detecting whether the remainder data is in a target range;
   if the remainder data is not in the target range, recognizing another behavior method from a pattern of situation features from the remainder data and identifying the another recognized behavior method;
   calculating parameter values, based on the situation features from the remainder data, for parameters in the another recognized behavior method; and
   executing the another recognized behavior method on the remainder data using the parameter values in the another recognized behavior method to recommend a merchandise allocation solution for the merchandise allocation situation.

4. The method of claim 3 wherein the acts of recognizing, calculating and executing for another recognized method are repeated until the act of detecting detects the remainder data is in the target range.

5. The method of claim 1 wherein the displaying step further comprises:
   displaying a strategy, the strategy being all the recognized behavior methods with parameter values and the solution data and remainder data for each recognized method.

6. The method of claim 5 further comprising: receiving adjustments to the strategy, the adjustments being at least one of changes in recognized methods and changes in parameter values.

7. The method of claim 1 wherein the act of extracting features bases the extraction on features that are significant in recognizing a behavior method.

8. The method of claim 1 wherein the act of recognizing a method is based on feature/method separation data in multi-dimensional space of features into areas with each area associated with a method used by experts.

9. The method of claim 1 wherein the act of calculating parameter values comprises:
  recognizing a parameter calculation rule for each parameter in the recognized behavior method from a pattern of situation features; and
  calculating the parameter values using parameter calculation rules using situation features.

10. The method of claim 9 wherein the act of recognizing a parameter calculation rule is based on feature/parameter-calculation-rules separation data in multidimensional space of features into areas with each area associated with a parameter calculation rule used by experts.

11. The method of claim 1 further comprising:
  capturing observations of actions taken by experts in analyzing a plurality of merchandise allocation situations;
  constructing behaviors from the observations, the behaviors indicating situation features and associated methods with parameter values.

12. The method of claim 11 further comprising:
  learning a history of merchandise allocation situations and associated behavior methods from the behaviors; and
  generating a profile of strategies from the history.

* * * * *